(12) United States Patent
Christie

(10) Patent No.: US 9,966,649 B2
(45) Date of Patent: May 8, 2018

(54) APPARATUS WITH MULTIPLE POLE MOUNTING CONFIGURATIONS

(71) Applicant: Pro Brand International, Inc., Marietta, GA (US)

(72) Inventor: Nathan Andrew Christie, Acworth, GA (US)

(73) Assignee: PRO BRAND INTERNATIONAL, INC., Marietta, GA (US)

( * ) Notice: Subject to any disclaimer, the term of this patent is extended or adjusted under 35 U.S.C. 154(b) by 0 days. days.

(21) Appl. No.: 15/088,284

(22) Filed: Apr. 1, 2016

(65) Prior Publication Data

US 2016/0294036 A1    Oct. 6, 2016

Related U.S. Application Data

(60) Provisional application No. 62/142,827, filed on Apr. 3, 2015.

(51) Int. Cl.
| | |
|---|---|
| A47B 96/06 | (2006.01) |
| H01Q 1/12 | (2006.01) |
| F16M 13/02 | (2006.01) |
| H01Q 3/06 | (2006.01) |

(52) U.S. Cl.
CPC .......... *H01Q 1/125* (2013.01); *F16M 13/022* (2013.01); *H01Q 1/1228* (2013.01); *H01Q 3/06* (2013.01)

(58) Field of Classification Search
USPC ...................................................... 248/219.4
See application file for complete search history.

(56) References Cited

U.S. PATENT DOCUMENTS

| | | | | |
|---|---|---|---|---|
| 6,262,691 | B1* | 7/2001 | Austin | H01Q 1/1221 |
| | | | | 343/878 |
| 6,535,177 | B1* | 3/2003 | Dhellemmes | H01Q 1/084 |
| | | | | 343/765 |
| 6,664,937 | B2* | 12/2003 | Vermette | H01Q 1/1228 |
| | | | | 248/278.1 |
| 7,880,682 | B2 | 2/2011 | Fruh et al. | |
| 8,020,824 | B2* | 9/2011 | Pan | F16M 11/10 |
| | | | | 248/222.51 |
| 8,339,329 | B2 | 12/2012 | Shen | |
| 8,451,187 | B2* | 5/2013 | Zihlman | H01Q 3/08 |
| | | | | 343/882 |
| 8,736,512 | B2 | 5/2014 | Grice et al. | |

(Continued)

FOREIGN PATENT DOCUMENTS

| | | |
|---|---|---|
| FR | 2836287 B1 | 5/2004 |
| WO | WO 2016/043791 A1 | 3/2016 |

OTHER PUBLICATIONS

International Search Report and Written Opinion, App No. PCT/US16/25618, dated Jul. 12, 2016, pp. 1-11.

*Primary Examiner* — Monica E Millner

(57) ABSTRACT

In one example an apparatus is provided. The apparatus includes a housing for coupling a satellite dish, an elevation adjustment bolt to perform an elevation adjustment on the satellite dish, an azimuth adjustment bolt to perform an azimuth adjustment on the satellite dish, a plate for coupling one or more U-bolts coupled to the housing, the plate comprising a curved portion that sits flush along a perimeter of a pole and a movable tab member coupled to the plate to allow for a plurality of different pole mounting configurations.

12 Claims, 20 Drawing Sheets

(56) References Cited

U.S. PATENT DOCUMENTS

| | | | |
|---|---|---|---|
| 8,794,578 B2* | 8/2014 | Lin | H01Q 1/1228 |
| | | | 248/218.4 |
| 9,136,582 B2* | 9/2015 | Lewry | H01Q 1/125 |
| 9,172,137 B2* | 10/2015 | Lee | H01Q 1/125 |
| 2006/0181477 A1* | 8/2006 | Lin | H01Q 1/125 |
| | | | 343/880 |
| 2010/0309090 A1* | 12/2010 | Grice | H01Q 1/125 |
| | | | 343/882 |
| 2011/0074652 A1* | 3/2011 | Lewry | H01Q 1/125 |
| | | | 343/882 |
| 2011/0193764 A1* | 8/2011 | Shen | H01Q 3/02 |
| | | | 343/882 |
| 2013/0013427 A1 | 5/2013 | Lee et al. | |
| 2015/0047445 A1* | 2/2015 | Yang | F16B 5/0216 |
| | | | 74/89.39 |
| 2015/0083875 A1 | 3/2015 | Lloyd | |

* cited by examiner

APPARATUS WITH MULTIPLE POLE MOUNTING CONFIGURATIONS

CROSS REFERENCE TO RELATED APPLICATIONS

This application claims priority to U.S. Provisional Patent Application Ser. No. 62/142,827, filed Apr. 3, 2015, which is herein incorporated by reference in its entirety.

The present disclosure relates generally to mounting satellite dishes and, more particularly, to an apparatus that provides multiple pole mounting configurations for a satellite dish.

BACKGROUND

Different types of mounts can be used to mount a satellite dish to a pole. Currently, pole mounts for coupling to a satellite dish require two separate designs for a mid-pole mounting and a pole-end mounting. The different designs and products add additional overhead and costs as two different products must be kept in inventory, two different products have to be produced, and the like.)

SUMMARY

According to aspects illustrated herein, there is provided an apparatus for providing a plurality of different pole mounting configurations. One disclosed feature of the embodiments is an apparatus comprising a housing for coupling a satellite dish, an elevation adjustment bolt to perform an elevation adjustment on the satellite dish, an azimuth adjustment bolt to perform an azimuth adjustment on the satellite dish, a plate for coupling one or more U-bolts coupled to the housing, the plate comprising a curved portion that sits flush along a perimeter of a pole and a movable tab member coupled to the plate to allow for a plurality of different pole mounting configurations.

Another disclosed feature is another embodiment of an apparatus for providing a plurality of different pole mounting configurations. The apparatus comprises a housing for coupling a satellite dish, an elevation adjustment bolt to perform an elevation adjustment on the satellite dish, an azimuth adjustment bolt to perform an azimuth adjustment on the satellite dish, a plate for coupling one or more U-bolts coupled to the housing, the plate comprising a curved portion that sits flush along a perimeter of a pole and a means for providing a plurality of different pole mounting configurations coupled to the plate.

Another disclosed feature of the embodiments is a method for mounting a satellite dish to a pole via a mounting bracket comprising a mid-pole mounting configuration and a pole-end mounting configuration. In one embodiment, the method positions a movable tab member coupled to a plate of the apparatus into a position for pole mounting a satellite dish via a pole-end mounting configuration, slides the apparatus onto a pole through one or more U-bolts coupled to the plate, wherein a perimeter of the pole sits flush with a curved portion of the plate, tightens the one or more U-bolts against the pole, couples the satellite dish to a mounting bracket of the apparatus and moves the apparatus to a middle portion of the pole.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure relates to an apparatus with multiple pole mounting configurations. Currently, pole mounts for coupling to a satellite dish require two separate designs for a mid-pole mounting and a pole-end mounting. The different designs and products add additional overhead and costs as two different products must be kept in inventory, two different products have to be produced, and the like.

One embodiment of the present disclosure provides a single apparatus that may be configured to be used for both a mid-pole mounting and a pole-end mounting. In other words, a single bracket may be used to mount a satellite dish on a pole in both a mid-pole mounting configuration and a pole-end mounting configuration. In other words, when the satellite is mounted in a mid-pole mounting configuration, the existing bracket does not need to be removed with a new bracket to mount the satellite in a pole-end mounting configuration.

Figure 1:
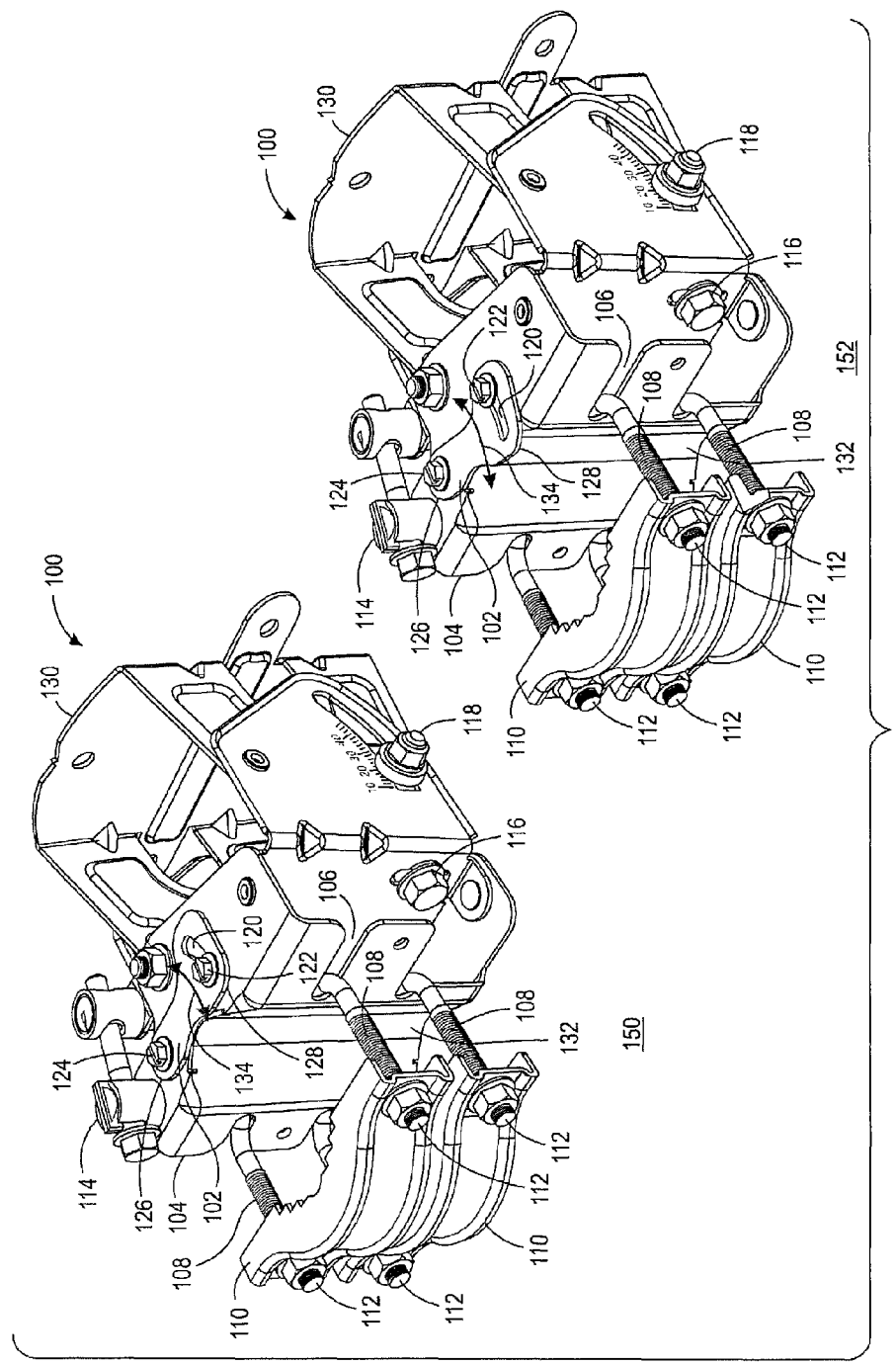
FIG. 1 illustrates a first example of an apparatus with multiple pole mounting configurations.

FIG. 1 illustrates a first example of an apparatus 100. In one example, the apparatus 100 may include a mounting bracket 130 (e.g., an azimuth/elevation (AzEl) mounting bracket) that couples to a satellite dish (not shown). In one embodiment, the apparatus 100 may include features that allow the apparatus 100 to be used for a plurality of mounting configurations. For example, the apparatus 100 may be used to mount the satellite in a mid-pole mounting configuration 150 and a pole-end mounting configuration 152.

In one example, the apparatus 100 may include a movable tab member 102 that allows the apparatus 100 to be used in both the mid-pole mounting configuration 150 and the pole-end mounting configuration 152. In one embodiment, the movable tab member 102 may include a first end 126 and a second end 128. In one embodiment, the second end 128 may be wider than the first end 128. For example, the width may be measured along an arrow 134 illustrated in FIG. 1.

In one embodiment, the first end 126 may be coupled to a plate 104 via a fastener 124. The fastener 124 may be a mechanical fastener (e.g., a bolt, a screw, a rivet, and the like) that allows the first end 126 to rotate around the fastener 124.

In one embodiment, the second end 128 may include a slot 120. A fastener 122 may be used to couple the second end 128 to the plate 104. The fastener 122 may be located in the slot 120. The slot 120 may be formed along a width of the second end 128 (e.g., along the line 134). The slot 120 may be slightly curved to coincide with the rotational movement of the first end 126 around the fastener 124. The fastener 122 may also be a mechanical fastener (e.g., a bolt, a screw, a rivet, and the like).

In one embodiment, the second end 128 may move along the slot 120 against the fastener. The slot 120 may allow the movable tab member 102 to move between two or more primary positions. In a first position shown in the mid-pole mounting configuration 150, the second end 128 may be pushed against the fastener 122 towards the bracket 130. As a result, the entire second end 128 is at least flush with an edge of the plate 104, or moved past on top of the plate 104 towards the bracket 130. Said another way, the movable tab member 102 is moved behind the edge of the plate 104 such that the entire movable tab member 102 rests on top of the plate 104. The "edge" of the plate 104 may refer to an outer edge that is located on a top side of the plate 104 that the movable tab member 102 is coupled to and is located on a side opposite of the bracket 130. Said another way, the "edge" of the plate 104 may refer to a line formed where two sides of the plate 104 meet. For example, the top side and a back side of the plate 104 may form the "edge" on the top side of the plate 104. In one embodiment, an edge of the movable tab member 102 may have a curved edge that is parallel to a curved portion 132 of the plate 104.

In one embodiment, the fastener 122 (and/or fastener 124) may be loosened to move the second end 128 into a desired position for the mid-pole mounting configuration 150. After the second end 128 is positioned properly, the fastener 122 may be tightened to secure the second end 128 against the plate 104 to ensure that the second end 128 does not move.

In a second position shown in the pole-end mounting configuration 152, the second end 128 may be pushed against the fastener 122 away from the bracket 130. As a result, a portion of the second end 128 may extend beyond the edge of the plate 104. In other words, a portion of the second end 126 may be located past the plate 104 such that no portion of the plate 104 is beneath the portion of the second end 128 that is extended beyond the edge of the plate 104. Said another way, when looking through a center of one or more U-bolts 108, the portion of the second end 128 that extends beyond the edge of the plate 104 may be visible.

In the pole-end mounting configuration 152, the portion of the second end 128 that extends beyond the edge of the plate 104 may rest on top of the pole end to prevent the apparatus 100 from sliding down the pole while a technician is installing the apparatus 100. Thus, a single apparatus 100 may be used having a single SKU number for both the mid-pole mounting configuration 150 and the pole-end mounting configuration 152.

In one embodiment, the apparatus 100 may also include one or more U-bolts 108. The U-bolts 108 may be fitted through slots 106 created in the plate 104. The U-bolts 108 may be coupled to the plate 104 using one or more brackets 110 via one or more fasteners 112. The fasteners 112 may be any type of mechanical fastener such as a bolt, a screw, a nut, and the like.

In one embodiment, the U-bolts 108 may secure the apparatus 100 against a pole. For example, the curved portion 132 may sit flush along a perimeter of the pole and be secured via the U-bolts 108. The brackets 110 may be adjusted based on a size of the pole and tightened against the pole and U-bolts 108 via the fasteners 112. In one embodiment, the brackets 110 may also have a curved portion along an inner side that sits flush against the perimeter of the pole.

In one embodiment, the apparatus 100 may also include a locking bolt 118, an azimuth adjustment bolt 114 and an elevation adjustment bolt 116. The locking bolt 118 may be used for coarse adjustments. The azimuth adjustment bolt 114 and the elevations adjustment bolt 116 may be used for fine adjustments in the azimuth and elevation directions, respectively.

Figure 2:
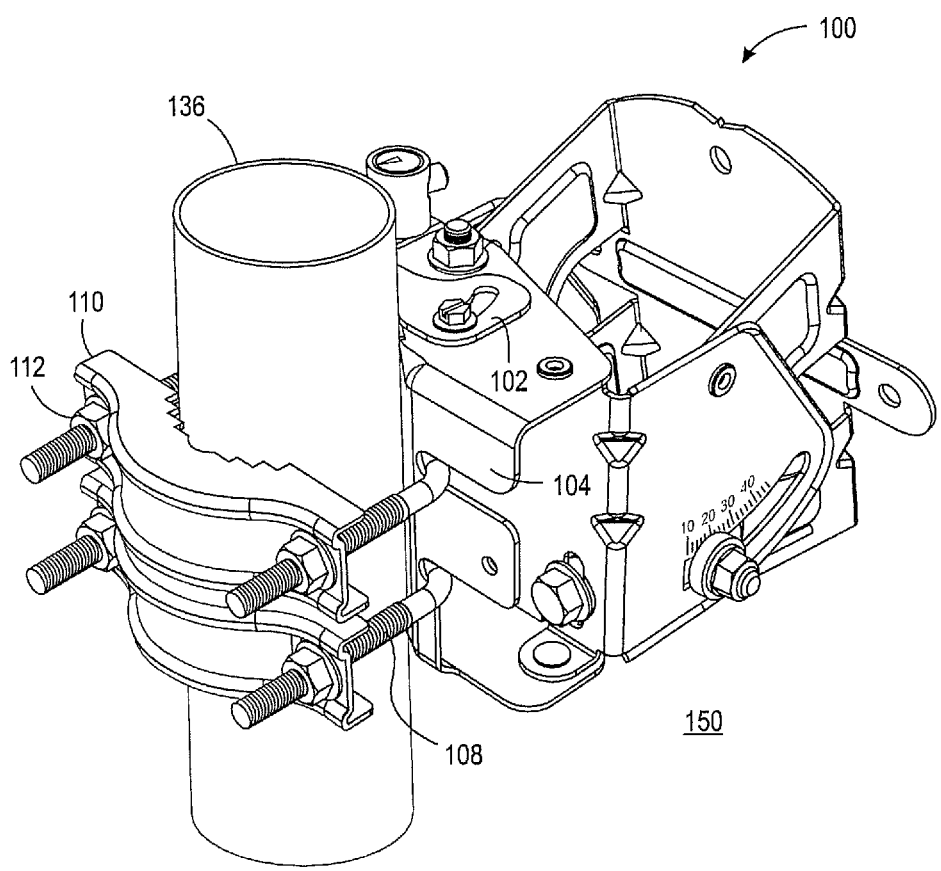
FIG. 2 illustrates an isometric view of the first example of the apparatus in a mid-pole mounting configuration.

FIG. 2 illustrates an isometric view of the apparatus 100 in the mid-pole mounting configuration 150. As described above, the movable tab member 102 is moved into a first position such that the movable tab member 102 rests on top of the plate 104. Said another way, no portion of the movable tab member 102 interferes with a pole 136 from resting flush against the curved portion 132 of the plate 104. The U-bolts 108 may be coupled to the plate 104 and the pole 136 with the brackets 110 and the fasteners 112, as shown in FIG. 2.

Figure 3:
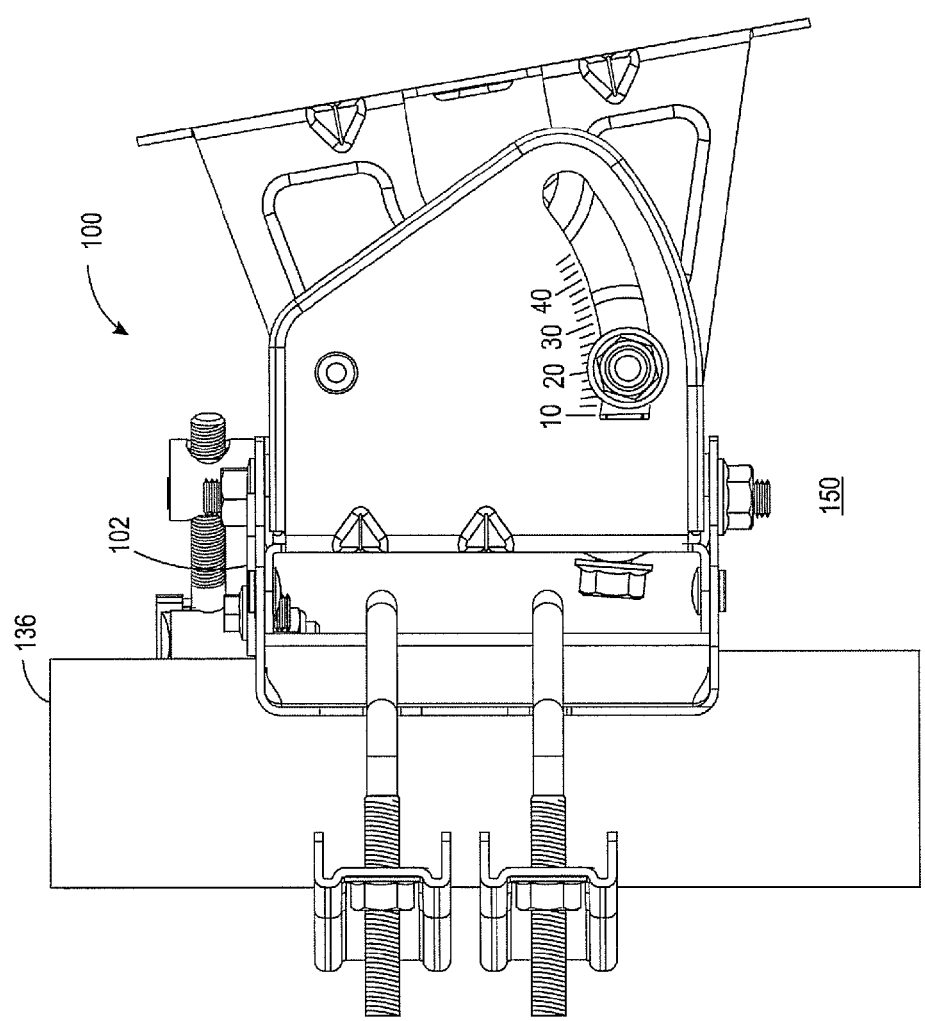
FIG. 3 illustrates a side view of the first example of the apparatus in the mid-pole mounting configuration.
Figure 4:
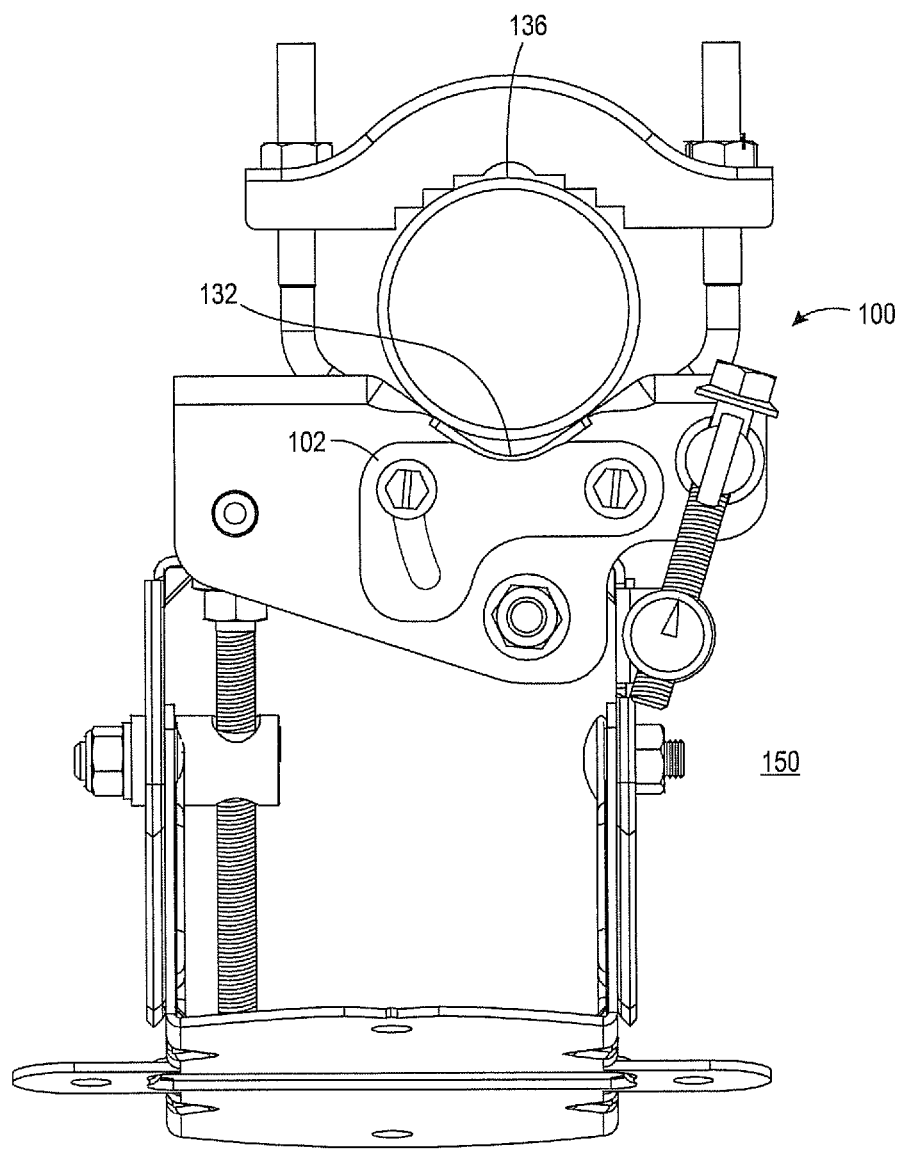
FIG. 4 illustrates a top view of the first example of the apparatus in the mid-pole mounting configuration.

FIG. 3 illustrates a side view of the apparatus 100 in the mid-pole mounting configuration 150. FIG. 4 illustrates a top view of the apparatus 100 in the mid-pole mounting configuration 150. Notably, the entire opening of the pole 136 is visible from the top view of the apparatus 100 in the mid-pole mounting configuration 150.

Figure 5:
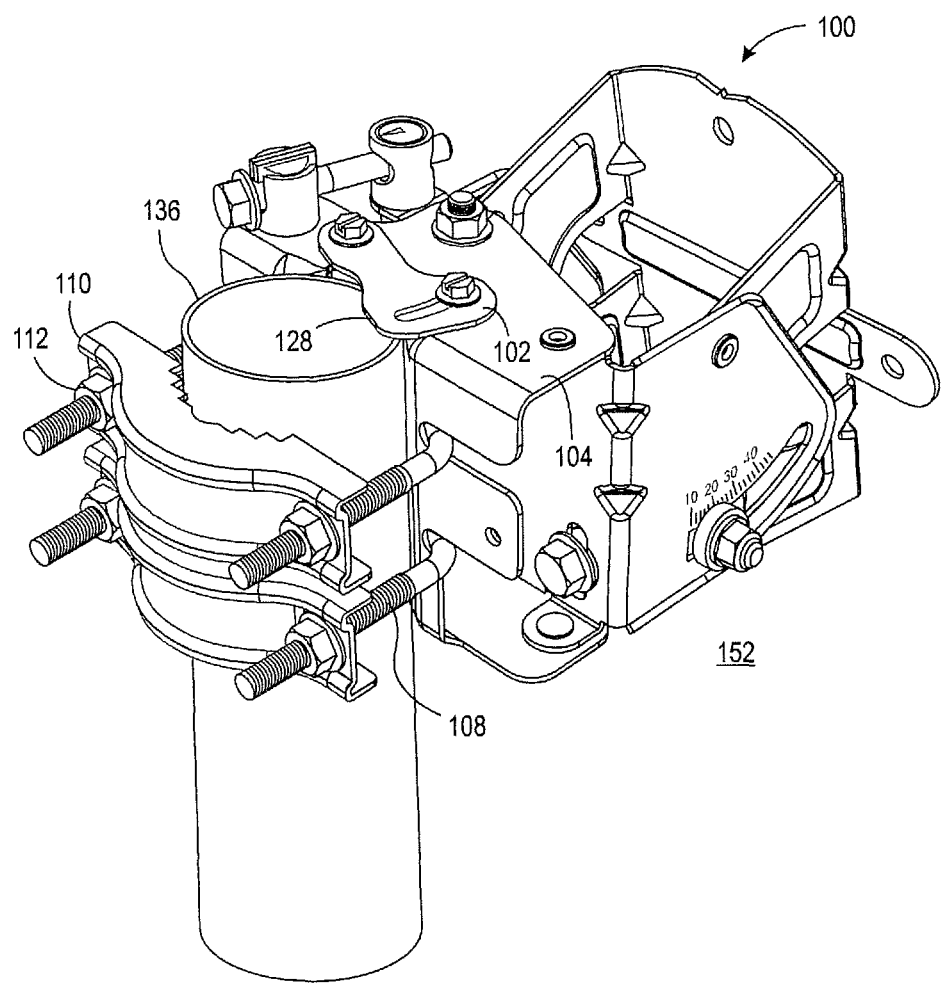
FIG. 5 illustrates an isometric view of the first example of the apparatus in a pole-end mounting configuration.

FIG. 5 illustrates an isometric view of the apparatus 100 in the pole-end mounting configuration 152. As described above, the movable tab member 102 is moved into a second position such that a portion of the second end 128 of the movable tab member 102 extends beyond the edge of the plate 104. As a result, the portion of the second end 128 that extends beyond the edge of the plate 104 may rest on top of the pole 136 for the pole-end mounting configuration 152. The portion of the second end 128 that extends beyond the edge of the plate 104 may prevent the apparatus 100 from sliding down the pole 136 while the technician securing the apparatus 100 to the pole 136 via the U-bolts 108, the brackets 110 and the fasteners 112.

Figure 6:
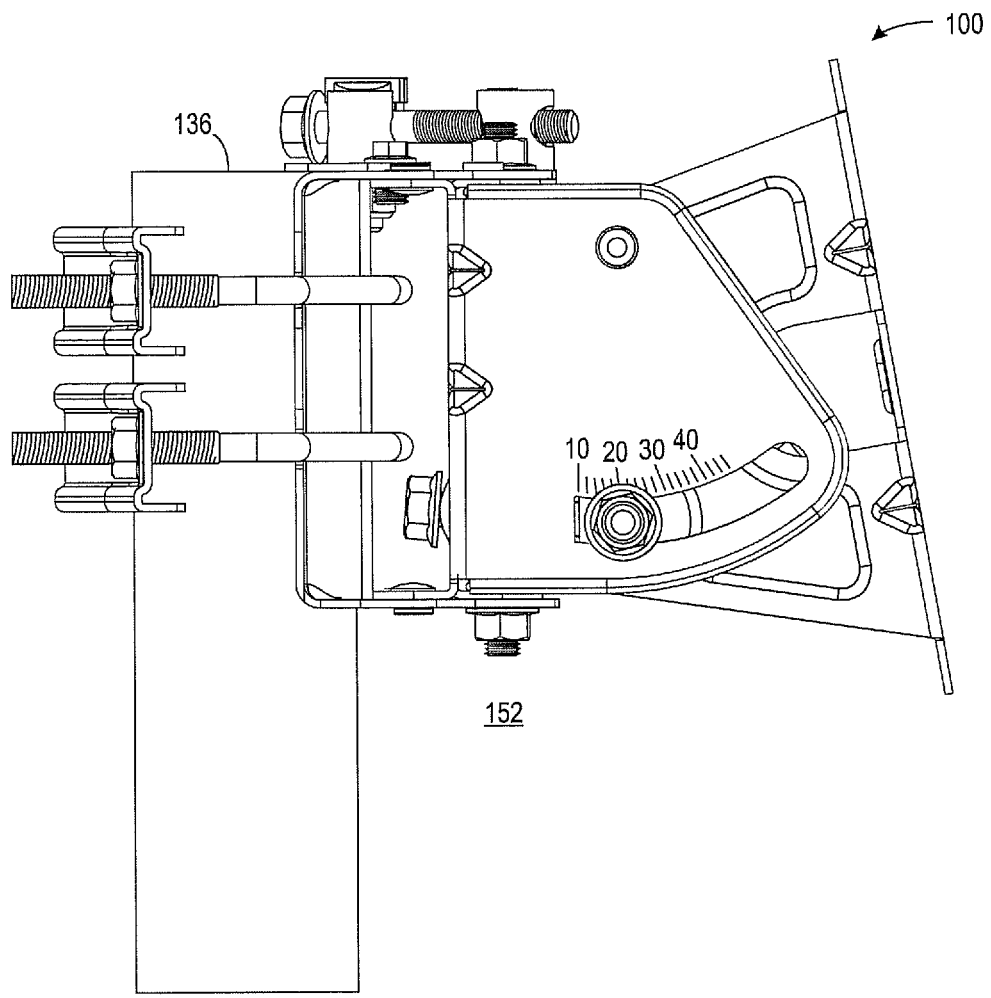
FIG. 6 illustrates a side view of the first example of the apparatus in the pole-end mounting configuration.
Figure 7:
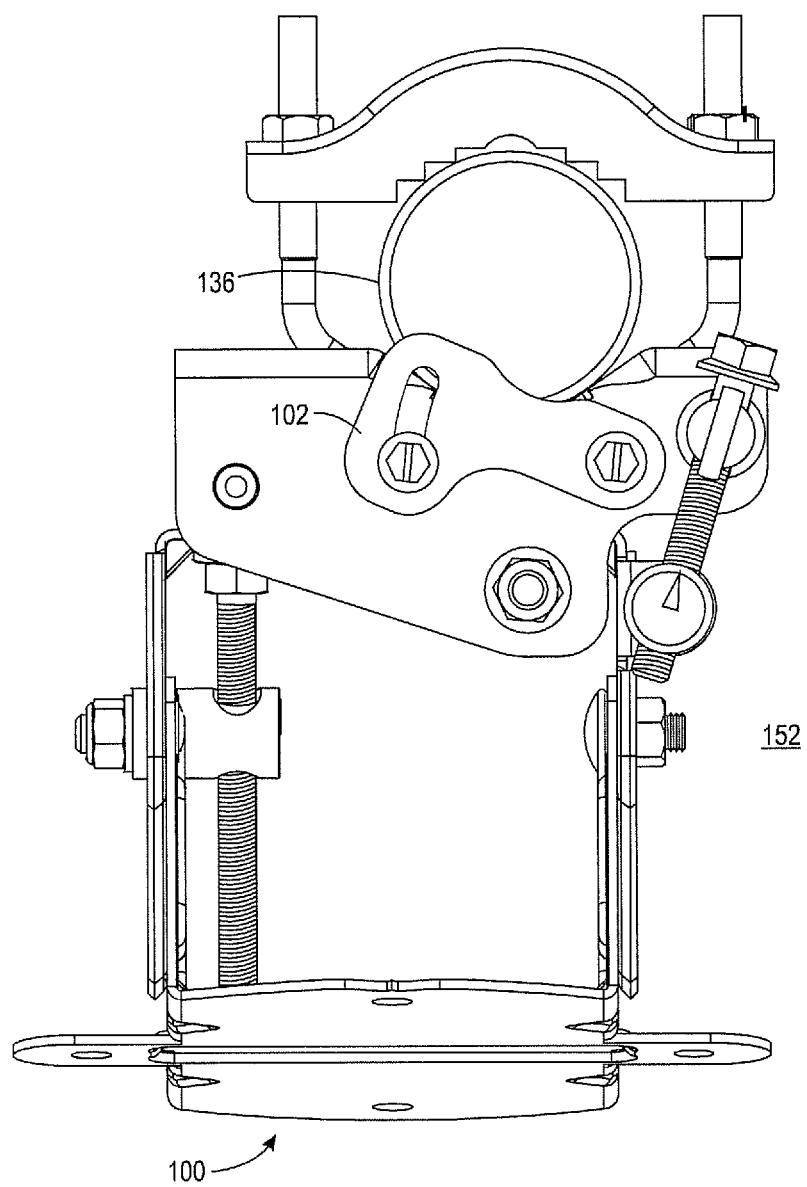
FIG. 7 illustrates a top view of the first example of the apparatus in the pole-end mounting configuration.

FIG. 6 illustrates a side view of the apparatus 100 in the pole-end mounting configuration 152. FIG. 7 illustrates a top view of the apparatus 100 in the pole-end mounting configuration 152. Notably, a part of the opening of the pole 136 is blocked from view in the top view of the apparatus 100 in the pole-end mounting configuration 152. The part of the opening of the pole 136 is blocked by the portion of the second end 128 that extends beyond the edge of the plate 104 over the pole 136.

Figure 8:
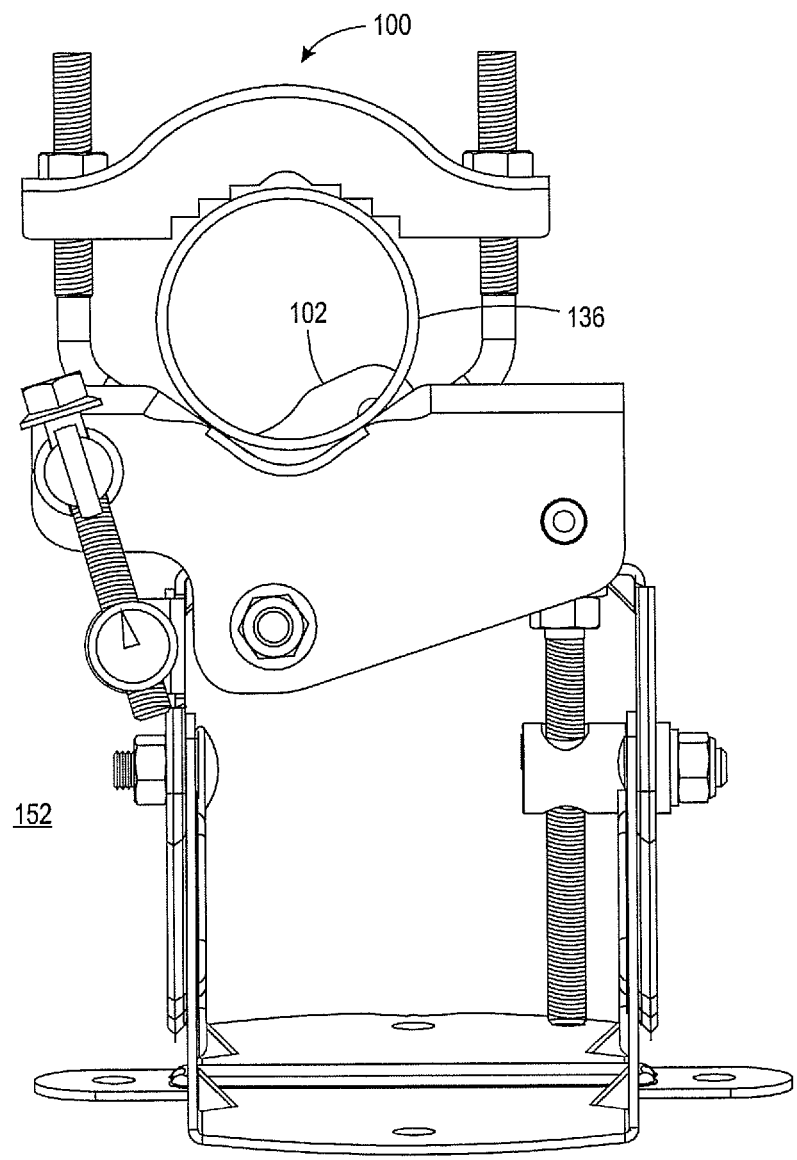
FIG. 8 illustrates a bottom view of the first example of the apparatus in the pole-end mounting configuration.

FIG. 8 is a bottom view of the apparatus 100 in the pole-end mounting configuration 152. Notably, when looking from a bottom end of the pole 136 and through the pole 136 and the U-bolts 108 the portion of the second end 128 of the movable tab member 102 is visible.

Figure 9:
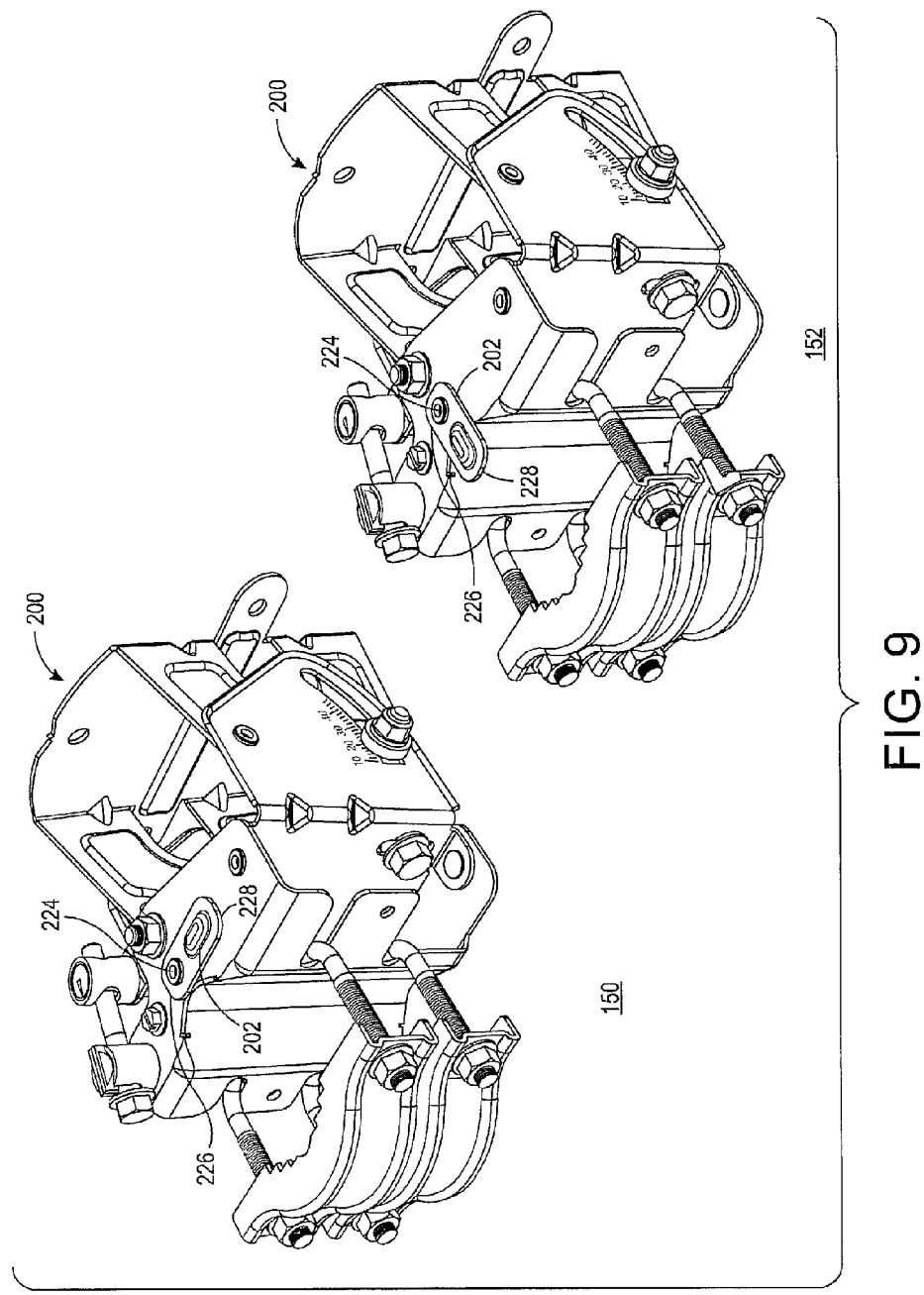
FIG. 9 illustrates a second example of an apparatus with multiple pole mounting configurations.

FIG. 9 illustrates an apparatus 200. In one embodiment, the apparatus 200 may also include the mounting bracket 130 for mounting a satellite dish (not shown). The apparatus 200 may also be used for the mid-pole mounting configuration 150 and the pole-end mounting configuration 152 using a single apparatus 200. In other words, the apparatus 200 may have a single SKU number for both the mid-pole mounting configuration 150 and the pole-end mounting configuration 152.

In one embodiment, the apparatus 200 may be similar to the apparatus 100 in all respects except for the movable tab member 202. The movable tab member 202 may be secured to the plate 104 via a fastener 224 on a first end 226. In one embodiment, the fastener 224 may be a rivet, a screw, a bolt, and the like.

In one embodiment, the movable tab member 202 may rotate 360 degrees around the fastener 224. The rotation around the fastener 224 may allow a second end 228 to move between a first position and a second position for the mid-pole mounting configuration 150 and the pole-end mounting configuration 152, respectively. In the first position, the movable tab member 202 may be moved behind an edge of the plate 104 to provide the mid-pole mounting configuration 150. For example, the second end 228 is located entirely above the plate 104. Said another way, no portion of the second end 228 of the movable tab member 202 extends over the edge of the plate 104.

In a second position for the pole-end mounting configuration 152, the second end 228 of the movable tab member 202 may be moved such that the second end 228 extends beyond the edge of the plate 104. For example, the movable tab member 202 may be rotated around the fastener 224 until the second end 228 extends beyond the edge of the plate 104 away from the bracket 130.

Figure 10:
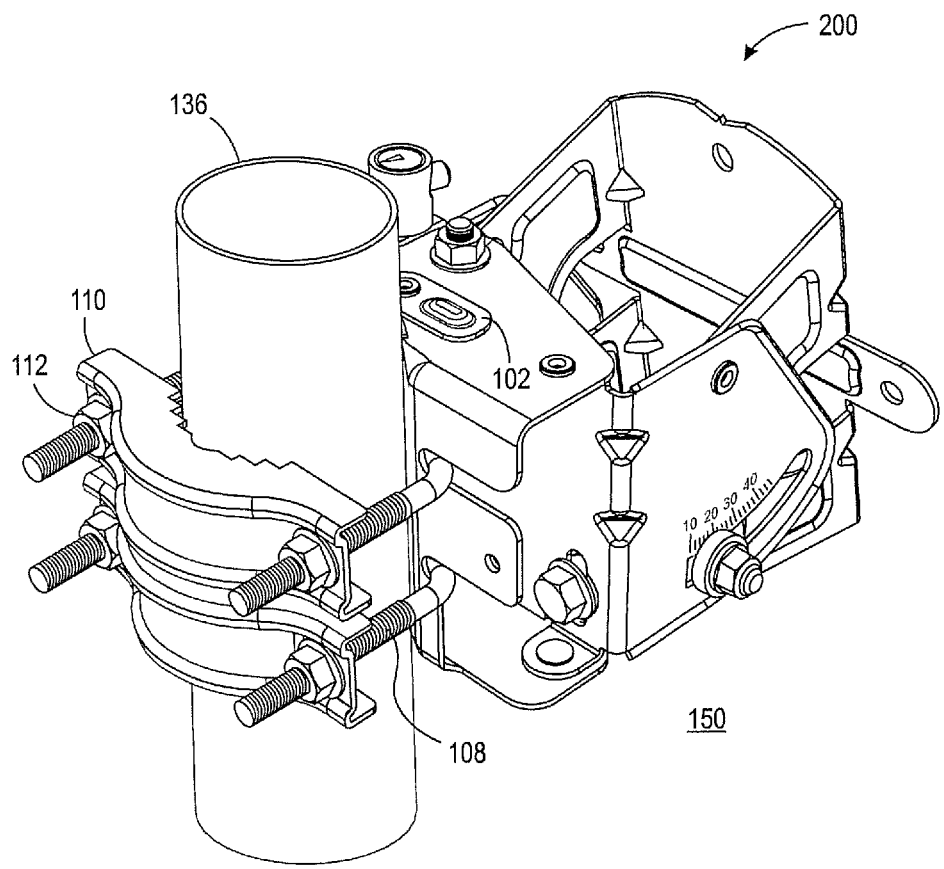
FIG. 10 illustrates an isometric view of the second example of the apparatus in a mid-pole mounting configuration.
Figure 11:
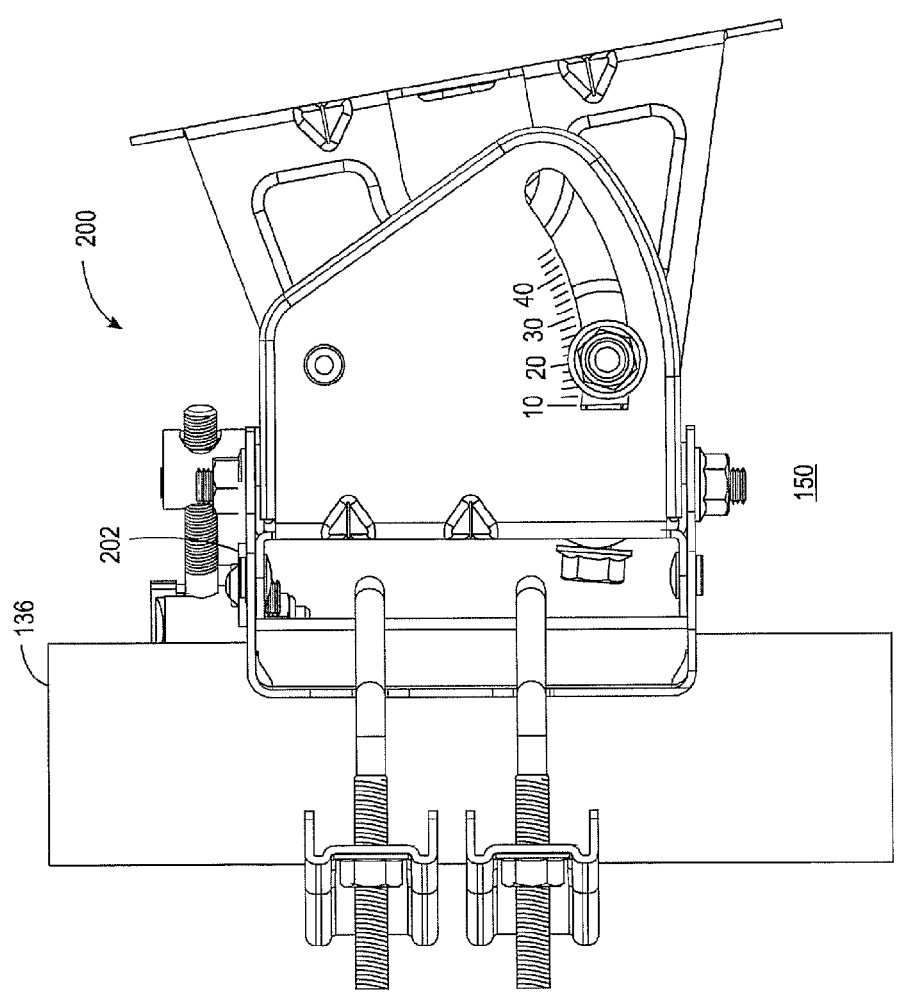
FIG. 11 illustrates a side view of the second example of the apparatus in the mid-pole mounting configuration.
Figure 12:
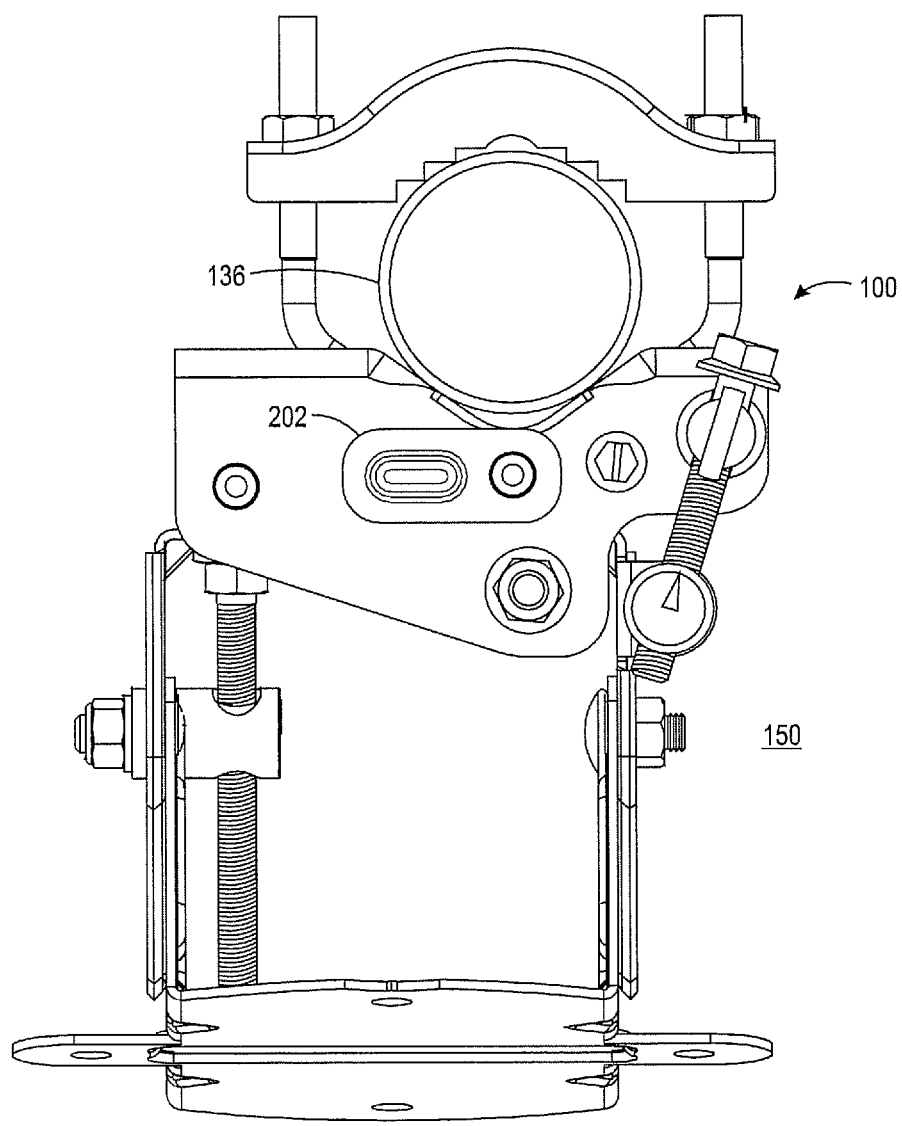
FIG. 12 illustrates a top view of the second example of the apparatus in the mid-pole mounting configuration.

FIG. 10 illustrates an isometric view of the apparatus 200 coupled to the pole 136 via the mid-pole mounting configuration 150. FIG. 11 illustrates a side view of the apparatus 200 in the mid-pole mounting configuration 150. FIG. 12 illustrates a top view of the apparatus 200 in the mid-pole mounting configuration 150. Notably, the entire opening of the pole 136 is visible from the top view of the apparatus 200 in the mid-pole mounting configuration 150. No portion of the movable tab member 202 covers any portion of the pole 136.

Figure 13:
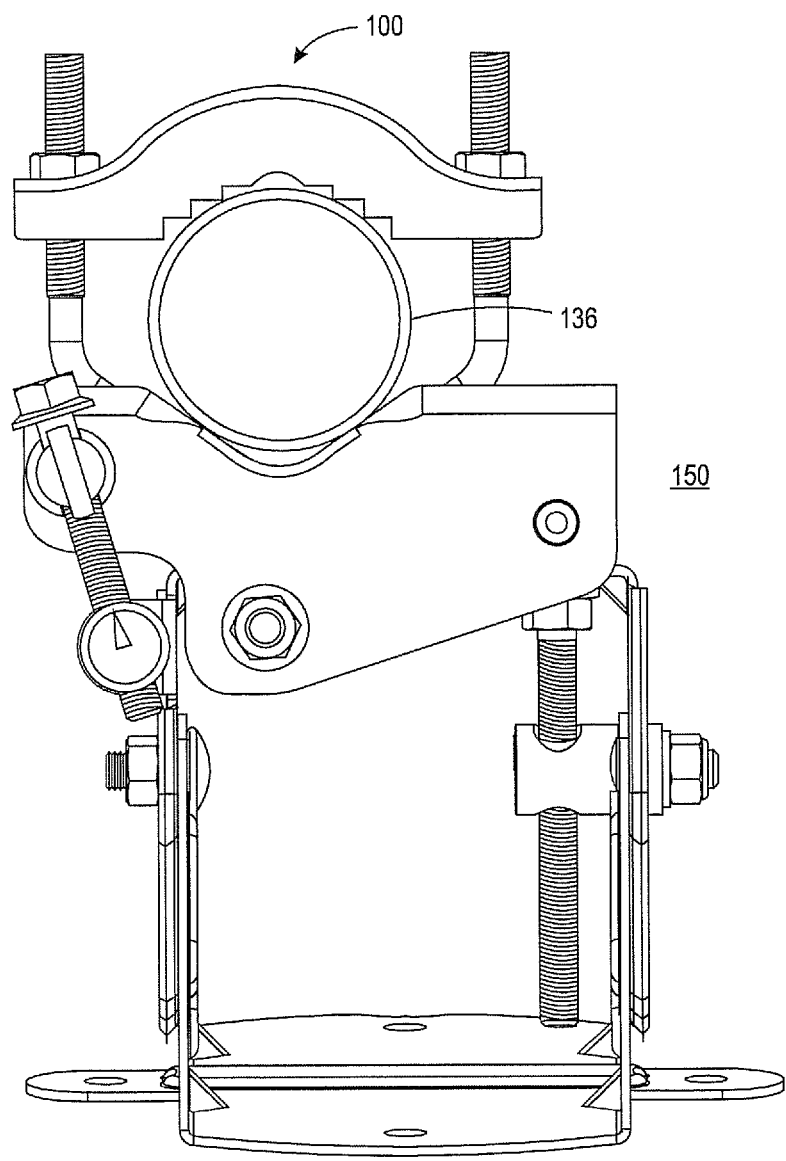
FIG. 13 illustrates a bottom view of the second example of the apparatus in the mid-pole mounting configuration.

FIG. 13 illustrates a bottom view of the apparatus 200 in the mid-pole mounting configuration 150. Again, looking through a bottom of the pole 136, no portion of the movable tab member 202 is visible.

Figure 14:
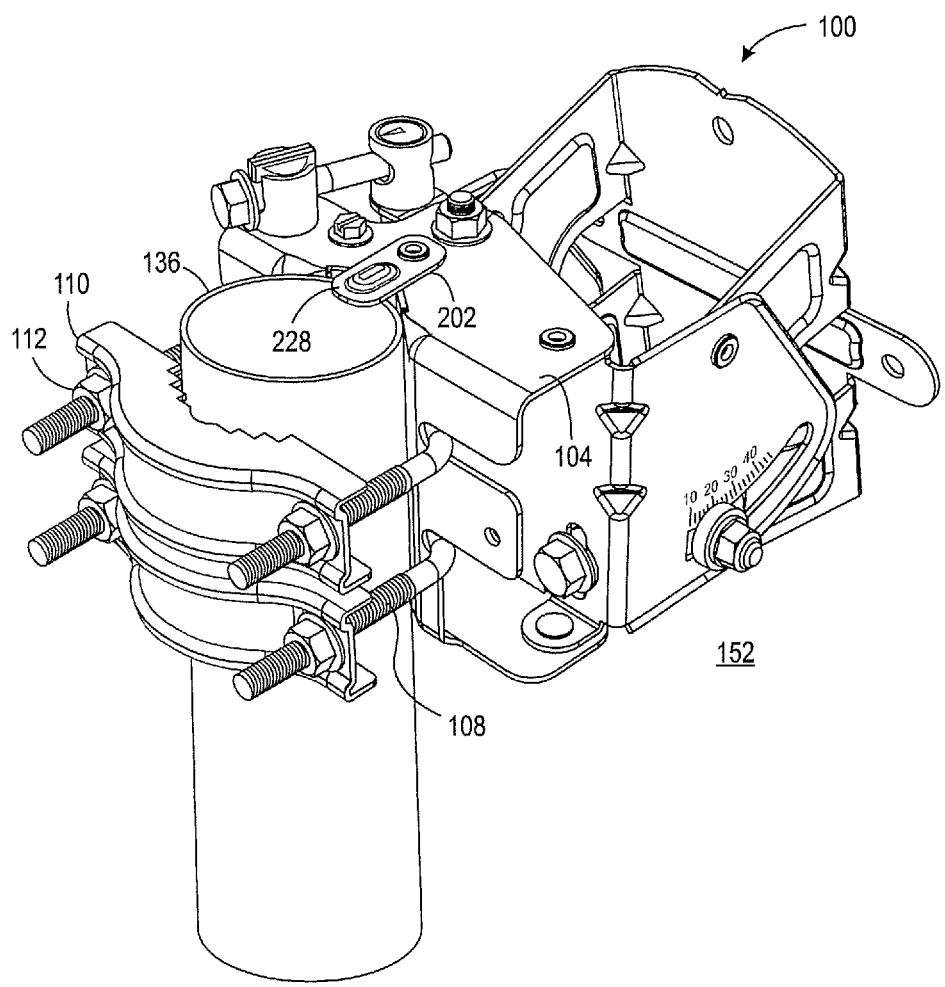
FIG. 14 illustrates an isometric view of the second example of the apparatus in a pole-end mounting configuration.

FIG. 14 illustrates an isometric view of the apparatus 100 in the pole-ending mounting configuration 152. As described above, the movable tab member 202 is moved into a second position such that a portion of the second end 228 of the movable tab member 202 extends beyond the edge of the plate 104. As a result, the portion of the second end 228 that extends beyond the edge of the plate 104 may rest on top of the pole 136 for the pole-end mounting configuration 152. The portion of the second end 228 that extends beyond the edge of the plate 104 may prevent the apparatus 200 from sliding down the pole 136 while the technician securing the apparatus 200 to the pole 136 via the U-bolts 108, the brackets 110 and the fasteners 112.

Figure 15:
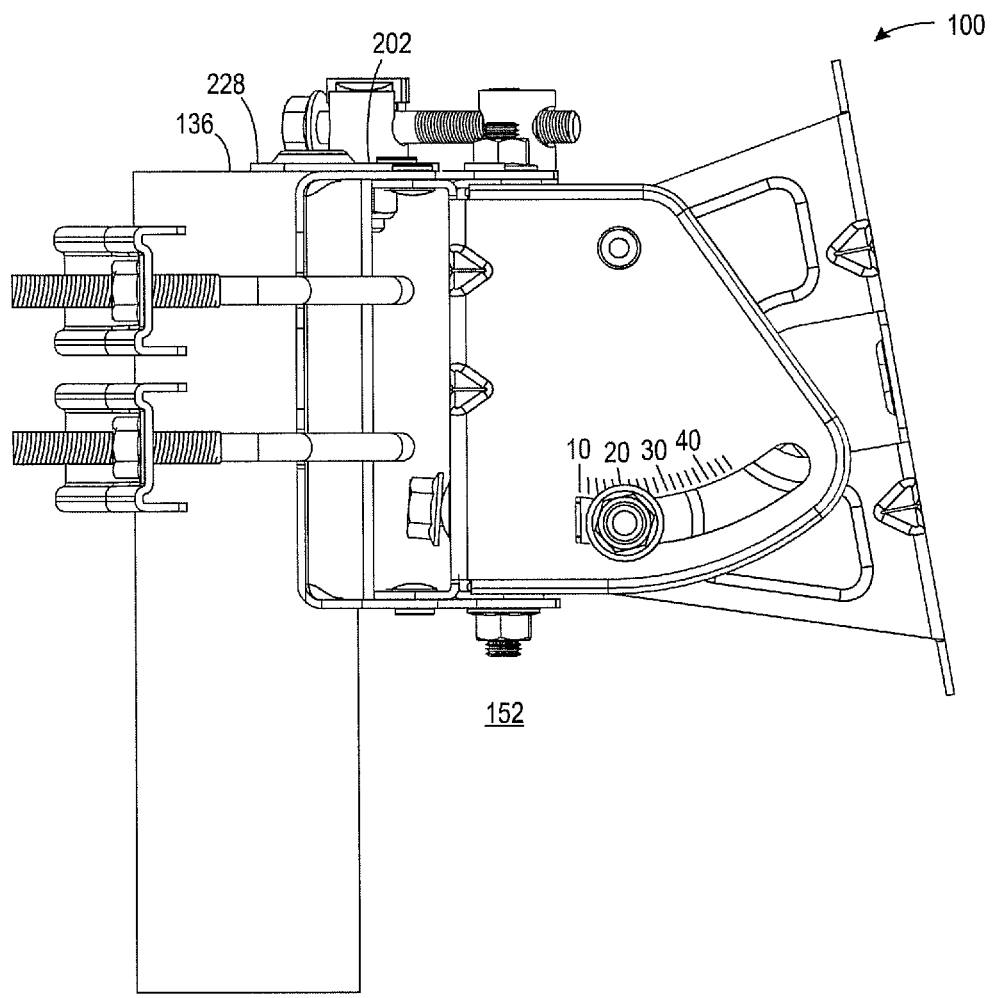
FIG. 15 illustrates a side view of the second example of the apparatus in the pole-end mounting configuration.
Figure 16:
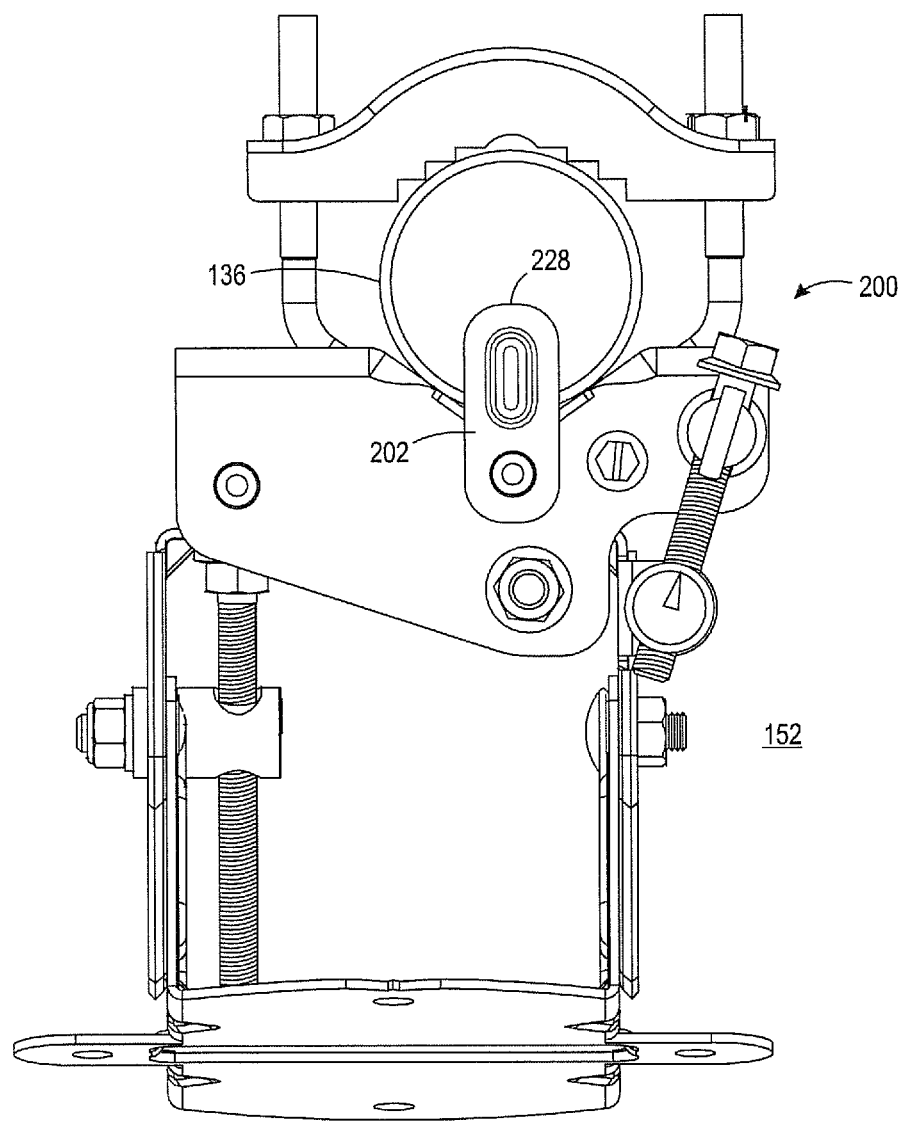
FIG. 16 illustrates a top view of the second example of the apparatus in the pole-end mounting configuration.

FIG. 15 illustrates a side view of the apparatus 200 in the pole-end mounting configuration 152. FIG. 16 illustrates a top view of the apparatus 200 in the pole-end mounting configuration 152. Notably, a part of the opening of the pole 136 is blocked from view in the top view of the apparatus 200 in the pole-end mounting configuration 152. The part of the opening of the pole 136 is blocked by the portion of the second end 228 that extends beyond the edge of the plate 104 over the pole 136.

Figure 17:
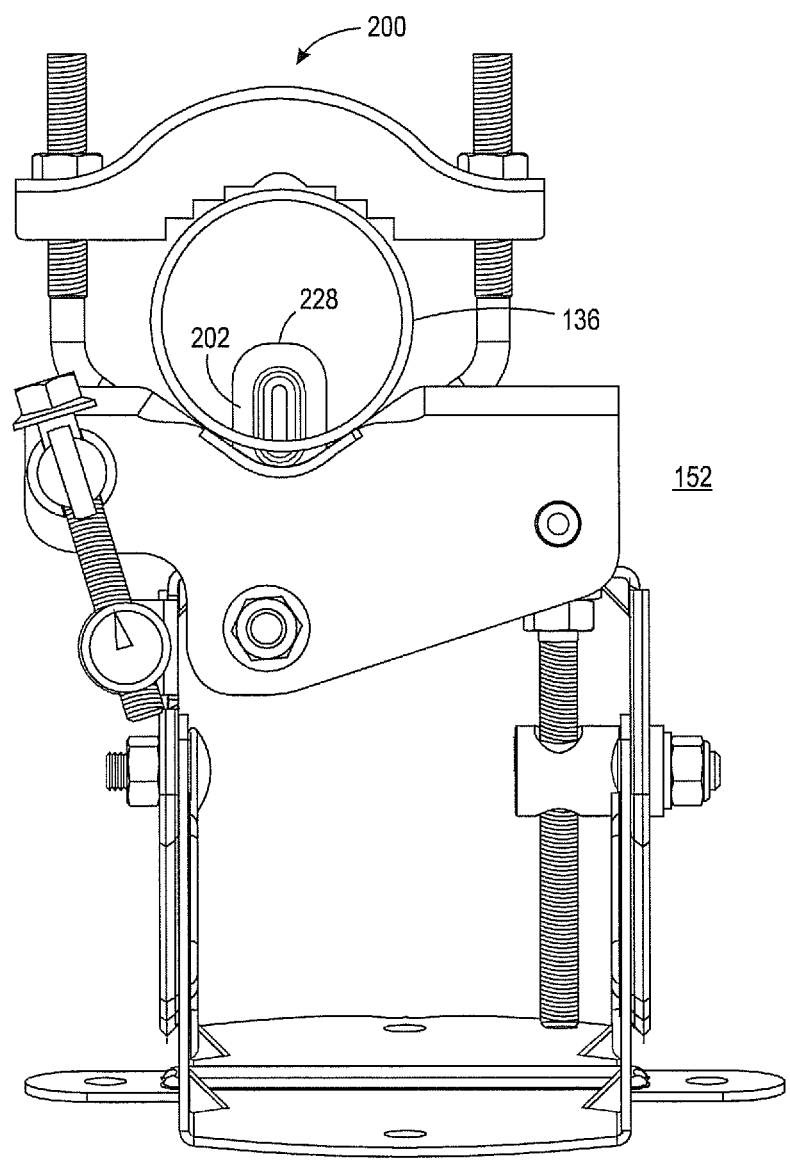
FIG. 17 illustrates a bottom view of the second example of the apparatus in the pole-end mounting configuration.

FIG. 17 illustrates a bottom view of the apparatus 200 in the pole-end mounting configuration 152. Notably, when looking from a bottom end of the pole 136 and through the pole 136 and U-bolts 108 the portion of the second end 228 of the movable tab member 202 is visible.

Figure 18:
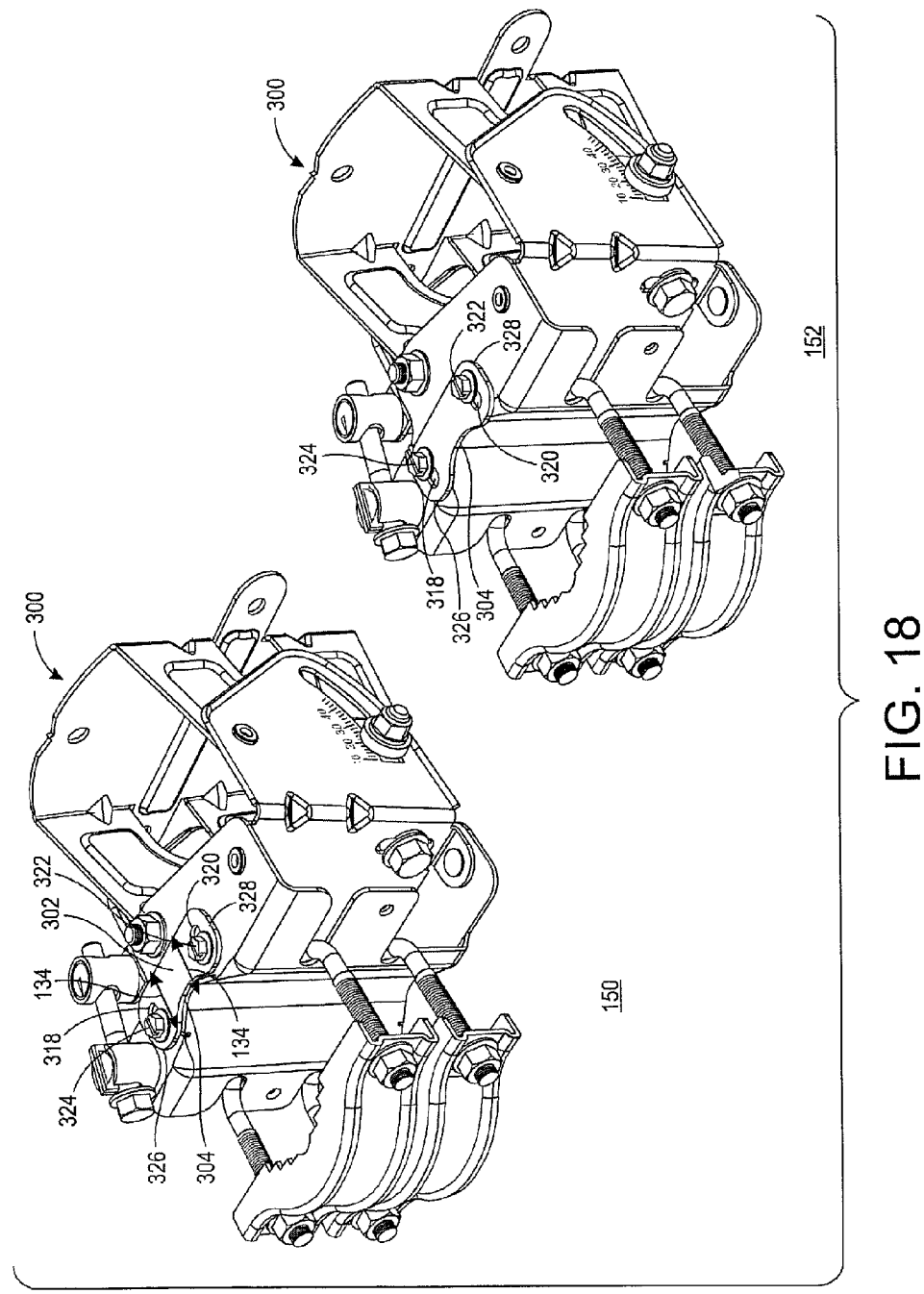
FIG. 18 illustrates a third example of an apparatus with multiple pole mounting configurations.

FIG. 18 illustrates an apparatus 300. In one embodiment, the apparatus 300 may also include the mounting bracket 130 for mounting a satellite dish (not shown). The apparatus 300 may also be used for the mid-pole mounting configuration 150 and the pole-end mounting configuration 152 using a single apparatus 300. In other words, the apparatus 300 may have a single SKU number for both the mid-pole mounting configuration 150 and the pole-end mounting configuration 152.

In one embodiment, the apparatus 300 may be similar to the apparatuses 100 and 200 in all respects except for the movable tab member 302. In one embodiment, the movable tab member 302 may include a first slot 318 in a first end 326 and a second slot 320 in a second end 328. The first slot 318 and the second slot 320 may be located on opposite ends and be parallel to one another. In one embodiment, the first slot 318 and the second slot 320 may be cut along a width (e.g., a direction along the line 134) of the first end 326 and the second end 328, respectively.

In one embodiment, a first fastener 324 may secure the first end 326 to the plate 104 via the first slot 318. In one embodiment, a second fastener 322 may secure the second end 328 to the plate 104 via the second slot 320. The first fastener 324 and the second fastener 322 may be a mechanical fastener, such as, a screw, a bolt, a rivet, and the like.

The first slot 318 and second slot 320 may allow the movable tab member 302 to slide forward and backward against the respective fasteners 324 and 322 between a first position for the mid-pole mounting configuration 150 and a second position for the pole-end mounting configuration 152. The fasteners 324 and 322 may be loosened to move the movable tab member 302 into a desired position along the first slot 318 and the second slot 320. Then the fasteners 324 and 322 may be tightened to secure the movable tab member 302 against the plate 104 to prevent movement of the movable tab member 302.

In one embodiment, the movable tab member 302 may include at least one edge 304 that comprises a curved portion. The edge 304 with the curved portion may sit flush with the curved portion 132 of the plate 104 when the movable tab member 302 is positioned for the mid-pole configuration 150. The edge 304 may be moved to extend beyond the edge of the plate 104 (e.g., moved away from the mounting bracket 130) for the pole-end configuration 152.

Figure 19:
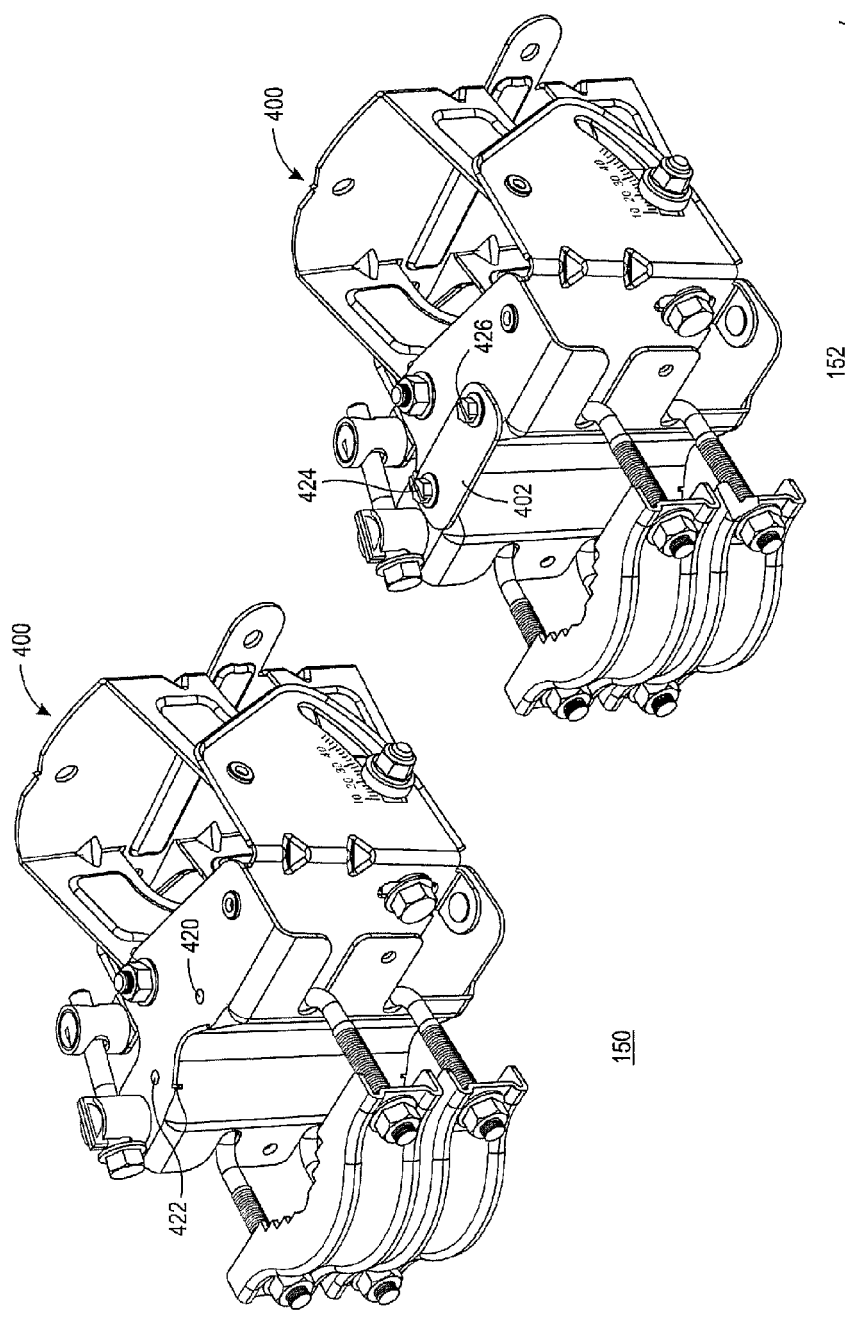
FIG. 19 illustrates a fourth example of an apparatus with multiple pole mounting configurations.

FIG. 19 illustrates an apparatus 400. In one embodiment, the apparatus 400 may also include the mounting bracket 130 for mounting a satellite dish (not shown). The apparatus 400 may also be used for the mid-pole mounting configuration 150 and the pole-end mounting configuration 152 using a single apparatus 400. In other words, the apparatus 400 may have a single SKU number for both the mid-pole mounting configuration 150 and the pole-end mounting configuration 152.

In one embodiment, the apparatus 400 may be similar to the apparatuses 100, 200 and 300 in all respects except for the movable tab member 402. In one embodiment, the movable tab member 402 may be removable from the plate 104. For example, the plate 104 may include one or more openings 422 and 420. The openings 422 and 420 may be threaded for a screw, or may be smooth for a nut and bolt.

In one embodiment, the movable tab member 402 may be removed for the mid-pole mounting configuration 150. In one embodiment, the movable tab member 402 may be coupled to the plate 104 via one or more fasteners 424 and 426 for the pole-end configuration 152. For example, the fasteners 424 and 426 may be inserted into a corresponding opening 422 and 420, respectively to secure the movable tab member 402 to the plate 104. The movable tab member 402 may be sized such that at least a portion of the movable tab member 402 extends beyond an edge of the plate 104 when coupled to the plate 104. In one embodiment, the movable tab member 402 may be included with the apparatus 400 and may be installed when the apparatus 400 is used for a pole-end mounting.

Figure 20:
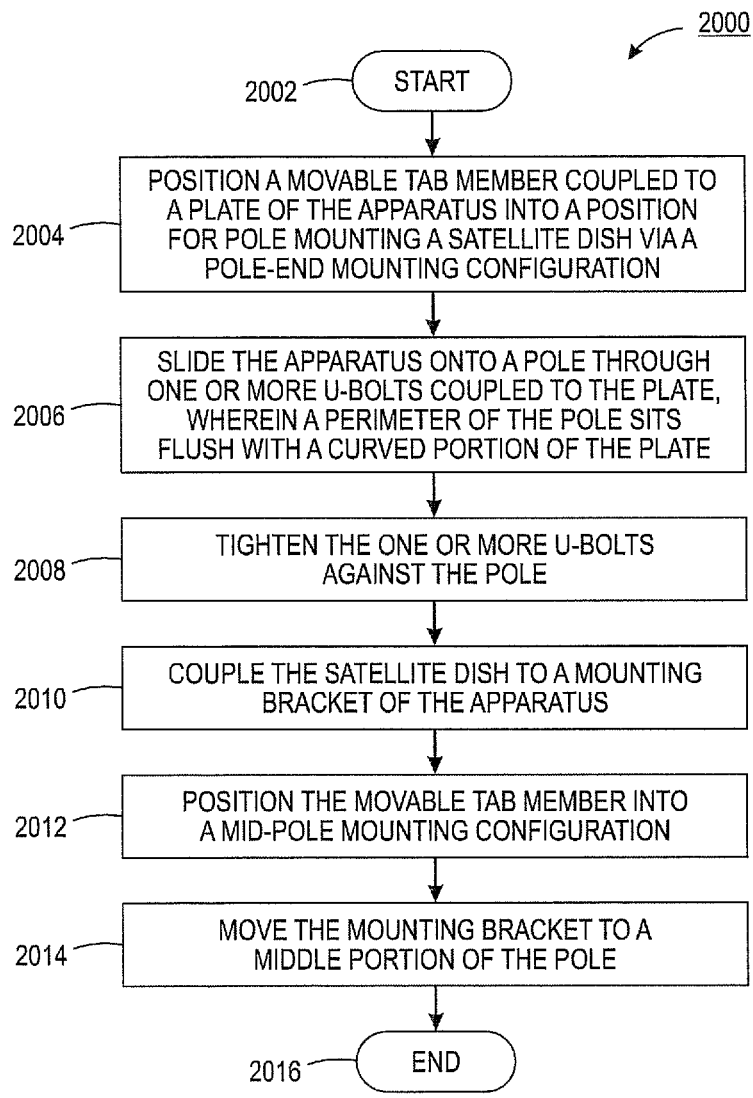
FIG. 20 illustrates a flowchart of an example method for mounting a satellite dish to a pole via an apparatus that provides a mid-pole mounting configuration and a pole-end mounting configuration.

FIG. 20 illustrates a flow chart of an example method 2000 for mounting a satellite dish to a pole via an apparatus that provides a mid-pole mounting configuration and a pole-end mounting configuration. The apparatuses 100, 200, 300 or 400 may be used to perform the method 2000.

At block 2004, the method 2000 positions a movable tab member coupled to a plate of the apparatus into a position for pole mounting a satellite dish via a pole-end mounting configuration. For example, the movable tab member may be coupled to the top of the plate when the movable tab member 402 is used. In another example, when the movable tab members 102, 202 or 302 are used, the movable tab member may be moved such that a portion of the movable tab member extends beyond an edge of the plate. As a result, the portion of the movable tab member that extends beyond the edge of the plate may rest on top of the pole.

At block 2006, the method 2000 slides the apparatus onto a pole through one or more U-bolts coupled to the plate, wherein a perimeter of the pole sits flush with a curved portion of the plate. For example, the pole may fit between inside of the U-bolts and rest flush against the curved portion of the plate. The apparatus may rest on top of the pole via the portion of the movable tab member that extends beyond the edge of the plate.

At block 2008, the method 2000 tightens the one or more U-bolts against the pole. For example, the U-bolts may be tightened against the pole via one or more corresponding brackets and fasteners.

At block 2010, the method 2000 couples the satellite dish to a mounting bracket of the apparatus. For example, once the apparatus is secured to the pole, the satellite dish may be safely coupled to the mounting bracket.

At block 2012, the method 2000 positions the movable tab member into a mid-pole mounting configuration. For example, the same apparatus that is coupled to the pole in a pole-end mounting configuration may also be used to mount the satellite dish in a mid-pole mounting configuration. For example, when the movable tab member 402 is used, the movable tab member 402 may be removed. In another example, when the movable tab members 102, 202 or 302 are used, the movable tab member may be moved such that the portion of the movable tab member that was extended beyond the edge of the plate is moved back behind the edge of the plate towards the mounting bracket. In other words, the portion of the movable tab member that was extended beyond the edge of the plate is moved such that an edge of the movable tab member is flush with the edge of the plate. Said yet another way, when looking through the bottom of the pole, no portion of the movable tab member is visible.

At block 2014, the method 2000 moves the apparatus into a middle portion of the pole. For example, the fasteners on the brackets coupled to the U-bolts may be loosened slightly to slide the apparatus down the pole into a desired position on the pole. At block 2016, the method 2000 ends.

Although various embodiments are disclosed, it should be noted that the movable tab members 102, 202, 302 and 402 may include other variations not illustrated. For example, a screw, nut or bolt may be used to block the opening where the pole would fit inside of the U-bolts 108. For example, one of the brackets 110 associated with the U-bolt 108 may be extended such that a bolt may be coupled to the bracket in a pole-end configuration. For a mid-pole configuration, the bolt may be rotated and moved back to allow a pole to pass freely through the U-bolts.

What is claimed is:

1. An apparatus, comprising:
   a housing for coupling to a satellite dish;
   an elevation adjustment bolt to perform an elevation adjustment on the satellite dish;
   an azimuth adjustment bolt to perform an azimuth adjustment on the satellite dish;
   a plate for coupling one or more U-bolts coupled to the housing, the plate comprising a curved portion that sits flush along a perimeter of a pole; and
   a movable tab member coupled to the plate, wherein the movable tab member comprises a first end and a second end, wherein the second end is moved from a pole-end mounting configuration, wherein a portion of the second end rests on a top of the pole, to a mid-pole mounting configuration where the apparatus is coupled against the pole below the top of the pole.

2. The apparatus of claim 1, wherein the second end comprises a slot, wherein the second end is coupled to the plate via a fastener placed through the slot.

3. The apparatus of claim 2, wherein the second end is wider than the first end.

4. The apparatus of claim 2, wherein the slot is formed along a width of the second end.

5. The apparatus of claim 4, wherein the second end moves along the slot against the fastener between at least a first position and a second position.

6. The apparatus of claim 5, wherein the mid-pole mounting configuration comprises curved edge of the movable tab member being flush with the curved portion of the plate.

7. The apparatus of claim 1, wherein the movable tab member is coupled to the plate via a fastener coupled to the first end of the movable tab member to allow for 360 degree rotation around the fastener.

8. The apparatus of claim 7, wherein the fastener comprises a rivet.

9. The apparatus of claim 7, wherein the movable tab member is rotated around the fastener between the pole-end mounting configuration and the mid-pole mounting configuration.

10. The apparatus of claim 9, wherein the mid-pole mounting configuration comprises the movable tab member being rotated behind an edge of the plate.

11. An apparatus, comprising:
    a housing for coupling to a satellite dish;

an elevation adjustment bolt to perform an elevation adjustment on the satellite dish;

an azimuth adjustment bolt to perform an azimuth adjustment on the satellite dish;

a plate for coupling one or more U-bolts coupled to the housing, the plate comprising a curved portion that sits flush along a perimeter of a pole; and a means for providing a plurality of different pole mounting configurations coupled to the plate, wherein the means for providing a plurality of different pole mounting configurations comprises a first end and a second end, wherein the second end is moved from a pole-end mounting configuration, wherein a portion of the second end rests on a top of the pole, to a mid-pole mounting configuration where the apparatus is coupled against the pole below the top of the pole.

12. A method for mounting a satellite dish to a pole via an apparatus that provides a mid-pole mounting configuration and a pole-end mounting configuration, comprising:

positioning a movable tab member coupled to a plate of the apparatus into a position for pole mounting a satellite dish via a pole-end mounting configuration;

sliding the apparatus onto a pole through one or more U-bolts coupled to the plate, wherein a perimeter of the pole sits flush with a curved portion of the plate;

tightening the one or more U-bolts against the pole;

coupling the satellite dish to a mounting bracket of the apparatus;

positioning the movable tab member into a mid-pole mounting configuration; and moving the apparatus to a middle portion of the pole.

\* \* \* \* \*